(12) United States Patent
Boomgaarden et al.

(10) Patent No.: US 9,352,428 B2
(45) Date of Patent: May 31, 2016

(54) LUMINAIRE WITH INTEGRALLY MOLDED COOLING SYSTEM AND METHOD FOR MANUFACTURING

(71) Applicant: LIGHTING SCIENCE GROUP CORPORATION, Satellite Beach, FL (US)

(72) Inventors: Mark P. Boomgaarden, Satellite Beach, FL (US); Eric Holland, Indian Harbour Beach, FL (US); Rick LeClair, Indian Harbour Beach, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 133 days.

(21) Appl. No.: 14/055,346

(22) Filed: Oct. 16, 2013

(65) Prior Publication Data

US 2014/0104845 A1   Apr. 17, 2014

Related U.S. Application Data

(60) Provisional application No. 61/715,075, filed on Oct. 17, 2012.

(51) Int. Cl.
*F21V 29/00* (2015.01)
*F21V 19/00* (2006.01)
(Continued)

(52) U.S. Cl.
CPC . *B23P 15/26* (2013.01); *F21K 9/13* (2013.01); *F21K 9/135* (2013.01); *F21K 9/90* (2013.01); *F21V 19/001* (2013.01); *F21V 29/2206* (2013.01); *F21V 29/773* (2015.01); *F21Y 2101/02* (2013.01); *F21Y 2103/022* (2013.01);
(Continued)

(58) Field of Classification Search
CPC . F21V 29/2268; F21V 29/2206; F21K 9/135; F21K 9/1355
See application file for complete search history.

(56) References Cited

U.S. PATENT DOCUMENTS 4,337,508 A * 6/1982 Moffatt .................. 362/294
6,511,209 B1 * 1/2003 Chiang .................. 362/294
(Continued)

FOREIGN PATENT DOCUMENTS

JP   WO2012/099251 A1 * 7/2012 .............. F21V 29/00

OTHER PUBLICATIONS

U.S. Appl. No. 13/832,878, filed Mar. 2013, Holland et al.
(Continued)

*Primary Examiner* — Jong-Suk (James) Lee
*Assistant Examiner* — Colin Cattanach
(74) *Attorney, Agent, or Firm* — Mark Malek; William Harding; Widerman Malek, PL (57) ABSTRACT

A luminaire comprising a base, an optic attached to the base, a heat sink integrally molded within the base, and a heat-generating element comprising an LED-based light source in thermal communication with the heat sink. The light source may be positioned such that light emitted by the LED is emitted into an optical chamber defined by the first housing. A second housing may comprise channels formed by opposing pairs of fin guards. The heat sink may comprise a plurality of fin assemblies connected along a perimeter of a heat-generating element contacting portion of the heat sink. A proximal edge of each fin assembly may be positioned adjacent to an outer surface of the first housing. A distal edge of each fin assembly may be positioned so as to be coextensive with a respective channel and substantially exposed to the environment external to the luminaire.

20 Claims, 8 Drawing Sheets

(51) Int. Cl.
  *B23P 15/26* (2006.01)
  *F21K 99/00* (2016.01)
  *F21V 29/77* (2015.01)
  *F28F 3/02* (2006.01)
  *F21Y 101/02* (2006.01)
  *F21Y 103/02* (2006.01)

(52) U.S. Cl.
  CPC .............. *F28F 3/02* (2013.01); *Y10T 29/49002* (2015.01); *Y10T 29/4935* (2015.01); *Y10T 29/49117* (2015.01)

(56) References Cited

U.S. PATENT DOCUMENTS

| | | | |
|---|---|---|---|
| 6,787,999 | B2 | 9/2004 | Stimac et al. |
| 6,799,864 | B2 | 10/2004 | Bohler et al. |
| D593,963 | S | 6/2009 | Plonski et al. |
| 7,748,870 | B2 | 7/2010 | Chang et al. |
| 7,762,315 | B2 | 7/2010 | Shen |
| 7,824,075 | B2 | 11/2010 | Maxik et al. |
| 7,922,356 | B2 | 4/2011 | Maxik et al. |
| 7,923,748 | B2 | 4/2011 | Ruffin |
| 8,021,019 | B2 | 9/2011 | Chen et al. |
| 8,125,776 | B2 | 2/2012 | Alexander et al. |
| 8,304,971 | B2 | 11/2012 | Huang |
| 8,342,733 | B2 * | 1/2013 | Daily et al. .................... 362/646 |
| 8,421,321 | B2 | 4/2013 | Chuang |
| 8,608,341 | B2 | 12/2013 | Boomgaarden et al. |
| 8,905,600 | B2 * | 12/2014 | Sun et al. ........................ 362/373 |
| 2002/0141197 | A1 * | 10/2002 | Petroski .................. F21L 4/027 362/373 |
| 2007/0236935 | A1 * | 10/2007 | Wang ............................ 362/294 |
| 2007/0240849 | A1 * | 10/2007 | Lin ....................... H01L 23/427 165/80.4 |
| 2008/0310167 | A1 * | 12/2008 | Zaderej .................. H05K 3/301 362/294 |
| 2010/0085765 | A1 * | 4/2010 | Wang ............................ 362/365 |
| 2010/0103669 | A1 * | 4/2010 | Yang et al. .................... 362/234 |
| 2010/0109499 | A1 * | 5/2010 | Vilgiate et al. .................... 313/1 |
| 2010/0110699 | A1 * | 5/2010 | Chou ............................ 362/365 |
| 2010/0207534 | A1 * | 8/2010 | Dowling ............. H05B 33/0818 315/186 |
| 2010/0264821 | A1 * | 10/2010 | Lutz et al. ........................ 315/32 |
| 2011/0037367 | A1 | 2/2011 | Wang et al. |
| 2011/0095690 | A1 * | 4/2011 | Sagal ...................... B29C 45/14 315/113 |
| 2011/0140136 | A1 * | 6/2011 | Daily et al. ........................ 257/89 |
| 2011/0254425 | A1 * | 10/2011 | Huang et al. ..................... 313/46 |
| 2012/0217861 | A1 | 8/2012 | Soni |
| 2012/0223632 | A1 * | 9/2012 | Hussell ..................... F21K 9/56 313/483 |
| 2012/0257386 | A1 * | 10/2012 | Harbers et al. ................ 362/235 |
| 2012/0268894 | A1 | 10/2012 | Alexander et al. |
| 2013/0223063 | A1 * | 8/2013 | Lee et al. ....................... 362/235 |
| 2013/0294085 | A1 * | 11/2013 | Watanabe ......... B29C 45/14467 362/294 |
| 2014/0003044 | A1 * | 1/2014 | Harbers et al. ................ 362/230 |
| 2014/0168020 | A1 * | 6/2014 | Stoytchev et al. ............. 343/721 |
| 2014/0376238 | A1 * | 12/2014 | Kadijk et al. .................. 362/382 |

OTHER PUBLICATIONS

Vetrovec, John, et al., "High-Performance Heat Sink for Solid-State Lighting", Proc. of SPIE, vol. 7231, 72310Q-1 through 9, (2009).

* cited by examiner

LUMINAIRE WITH INTEGRALLY MOLDED COOLING SYSTEM AND METHOD FOR MANUFACTURING

RELATED APPLICATIONS

This application claims the benefit under 35 U.S.C. §119 (e) of U.S. Provisional Patent Application Ser. No. 61/715,075 filed on Oct. 17, 2012 and titled Lighting Device With Integrally Molded Cooling System and Associated Methods, the entire content of which is incorporated herein by reference. This application is also related to U.S. Utility patent application Ser. No. 13/832,900 filed on Mar. 15, 2013 and titled Luminaire With Modular Cooling System and Associated Methods, the entire content of which is incorporated herein by reference.

FIELD OF THE INVENTION

The present invention relates to the field of lighting devices and, more specifically, to the design and manufacture of luminaires having integrally molded cooling systems, and associated methods.

BACKGROUND

Digital lighting technologies such as light-emitting diodes (LEDs) offer significant advantages over incandescent and fluorescent lamps. These advantages include, but are not limited to, better lighting quality, longer operating life, and lower energy consumption. Consequently, LED-based lamps are increasingly being used to replace legacy light sources in conventional lighting fixtures. However, a number of design challenges and costs are associated with replacing traditional lamps with LED illumination devices. These design challenges include light production, thermal management, and manufacturing cost control.

By the very nature of their design and operation, LEDs have a directional light output. Consequently, employing LEDs to produce light distribution properties approximating or equaling the light dispersion properties of traditional lamps may require the costly and labor-intensive replacement or reconfiguration of the host light fixture, and/or the expensive and complexity-introducing design of LED-based solutions that minimize the installation impact to the host light fixture. Often material and manufacturing costs are lost in this trade off.

Another challenge inherent to operating LEDs is heat. When an LED operates in a high-temperature ambient environment and/or a space-limited enclosure, the heat generated by an LED and its attending circuitry can cause overheating and premature failure of the LED. Thermal management describes a system's ability to draw heat away from an LED. Passive cooling technology, such as a heat sink thermally coupled to a digital illumination device, may be used to transfer heat from a solid material to a fluid medium such as, for example, air. To prevent overheating of the LED, a heat sink must be designed to absorb and dissipate heat at a sufficient rate with respect to the amount of heat being generated by the LED. If the heat sink does not have the optimal amount of capacity, the heat can gradually build up behind the LED and cause damage to the components.

The heat dissipation requirements of common digital lighting solutions, as well as the limitations imposed by legacy light fixture designs, also can add cost and complexity to lighting assembly manufacturing. For example, external heat sinks typically are exposed to the visibility of consumers and, therefore, are often painted during manufacturing for aesthetic purposes. Painting heat sinks adds material and manufacturing costs to the overall price of the lamp product. Furthermore, the addition of circuitry to cause an LED-based luminaire to mimic the operational characteristics of a legacy lighting device also adds material and manufacturing costs. The lighting industry is experiencing advancements in design of LED-based lighting devices, some of which may be pertinent to certain aspects of manufacturing replacement lighting devices for legacy lamps.

U.S. patent application Ser. No. 12/910,340 by Sagal discloses at least one LED mounted on the exterior side of an electronic circuit board, and a thermally conductive housing material overmolded onto a peripheral portion of the electronic circuit board to form a heat sink. Such a molding method is designed to deliver product consistency and reliability. This molding method may, however, be difficult to maintain when manufacturing lamps with a multi-component design due to the typically labor-intensive and error-prone conventional hand assembly or semi-automated assembly processes employed.

U.S. patent application Ser. No. 13/149,179 by Chuang discloses an LED light bulb comprising a light source baseboard securely coupled to a heat sink. The fins of the heat sink are externally exposed to the environment surrounding the bulb and extend substantially near the base of the bulb. Similarly, U.S. patent application Ser. No. 12/987,104 by Huang discloses an LED light bulb with all of its heat sink fins fully exposed to contact with external air. As described above, the disclosed heat sink solutions both use fins that occupy most available circumferential space projecting outward from the surface of the heat sink, leaving no room for auxiliary devices. Also, because external heat sinks of such a design are predominately exposed to the visibility of consumers, the heat sinks are often painted during manufacturing for aesthetic purposes. Painting heat sinks adds material and manufacturing costs to the overall price of the lamp product.

U.S. patent application Ser. No. 12/649,631 by Ruffin discloses a heat sink for use with a high output LED light source. The heat sink comes into thermal contact with groups of outer vanes to increase the total heat dissipation surface area available to the light source. However, no thermal insulation exits between the fins of the heat sink and the LEDs to more effectively keep dissipated heat and ambient environment heat from reaching the LED light source. Lamp designs like those disclosed by Ruffin and the other designs described above typically feature heat sinks with fins extending toward the back of a lamp. Such designs suffer from unfavorable heat dissipation characteristics when used in a space-limited environment such as a can light fixture because much of the heat generated by LEDs comes out the back of the lamp itself.

Accordingly, and with the above in mind, a need exists for an LED-based luminaire design that supports simplified manufacturing of a luminaire that meets the operational and aesthetic requirements of consumers. More specifically, a need exists for a luminaire design that facilitates automated assembly and that minimizes costly and error-prone hand assembly and semi-automated assembly processes. A luminaire design is needed that employs thermal insulation to effectively keep dissipated heat and ambient environment heat from reaching an LED-based light source on the luminaire, particularly when the luminaire employed in a space-limited environment such as a can light fixture. A design is needed for a luminaire that provides passive cooling capability while reserving space on the structure of the luminaire for auxiliary devices. Furthermore, a luminaire design is needed for a luminaire that is aesthetically pleasing to a consumer but may be fabricated without adding the material and manufacturing costs of painting or otherwise covering passive cooling components.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an improved LED-based luminaire for use as a legacy lamp retrofit in a space-limited lamp enclosure, such as a can light fixture. The LED-based luminaire may comprise an integrally molded cooling system which, according to embodiments of the present invention, may position a heat sink substantially beneath a molded, thermally-insulating structure to advantageously facilitate heat dissipation while reserving protected spaces for heat-sensitive auxiliary devices. The integrally molded heat sink may advantageously be positioned substantially closer to the open-air environment adjacent a space-limited lamp enclosure to achieve favorable heat dissipation characteristics. The present invention also may advantageously provide a cooling system for a digital lighting device that is inexpensive to manufacture, install, and operate, while advantageously meeting the aesthetic and operational requirements of consumers. These and other objects, features, and advantages according to the present invention are provided by a luminaire having an integrally molded cooling system that may include a base, a heat sink, and a heat-generating element.

The base may comprise a first housing and a second housing. The first housing may have a hollow frustum shape characterized by an increased diameter from an upper end of the first housing towards a lower end of the first housing. The inner surface of the first housing may be configured to define an optical chamber having a volume. The second housing may comprise a plurality of channels each formed by an opposing pair of fin guards. The second housing also may comprise a circuitry chamber having a substantially cylindrical walled core. A power supply may be carried within the circuitry chamber.

The heat sink may comprise a heat-generating element contacting portion and a plurality of fin assemblies. An inner surface of the heat sink may be positioned adjacent to an outer surface of the first housing, and an outer surface of the heat sink may be positioned adjacent an inner surface of the second housing. The heat sink also may comprise a sidewall portion. A perimeter of the heat-generating element contacting portion may be connected to an inner surface of the sidewall portion. The heat-generating element contacting portion may comprise at least one thermally conductive material and may include an aperture through which an electrical connector may pass to form an electrical connection with the heat-generating element.

Each of the fin assemblies may have an elongate shape, and may be connected to the perimeter of the heat-generating element contacting portion. Each of the plurality of fin assemblies may comprise a body portion and at least one fin. Each fin may extend outwardly from the body portion. The body portion may be positioned substantially adjacent to an outer surface of the sidewall portion. Some number of fin assemblies may be identical in shape. Each of the fin assemblies of the heat sink may be positioned within a respective channel in the second housing so that each fin assembly is substantially exposed to the environment external to the luminaire. A proximal edge of each fin assembly may be positioned adjacent to the outer surface of the first housing. A distal edge of each fin assembly may be positioned coextensively with the respective channel such that the distal edge is substantially exposed to the environment external to the luminaire. A fin assembly may comprise a pair of fins that define a void therebetween. Each of the fin assemblies may be configured to engage the second housing such that a proximal edge of the fin assembly is positioned adjacent to an exterior of the circuitry chamber.

The heat-generating element may comprise a light source, and may be positioned in thermal communication with the heat-generating element contacting portion of the heat sink and/or with the second housing. The light source may comprise a circuit board and a light-emitting diode (LED). The circuit board may have a substantially planar body, and the light-emitting diode (LED) may be disposed on the circuit board. The light source may be positioned adjacent to the upper end of the first housing and such that light emitted by the LED is emitted into the optical chamber and toward the lower end of the first housing. At least one of the circuit board and the first housing may comprise a reflective layer. The reflective layer may be disposed adjacent to the optical chamber, and may be configured to reflect light incident thereupon into the optical chamber. The reflective layer may be configured to reflect light incident thereupon at an intensity of at least about 95% of the original intensity of the incident light.

The luminaire may comprise an optic configured to collimate, refract, and/or diffuse light emitted by the light source. The optic may be positioned adjacent to the lower end of the first housing and attached to the first housing to seal the optical chamber between the light source, the inner surface of the first housing, and the optic. The optic may comprise a color conversion layer. The color conversion layer may comprise a conversion material configured to convert light emitted by the light source within a first wavelength range to a converted light within a second wavelength range.

Embodiments of the invention are also directed to a method for assembling a luminaire. The method may comprise the steps of overmolding the light source with the first housing, positioning the heat-generating element contacting portion in thermal communication with the light source, and overmolding the heat sink with a second housing such that each fin assembly of the heat sink is positioned in a respective channel in the second housing and is substantially exposed to the environment external to the luminaire. The method may further comprise the steps of installing electrical circuitry within the circuitry chamber, and/or of attaching an optic adjacent to a lower end of the first housing to seal an optical chamber between the light source, the first housing, and the optic.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference, or represents a characteristic that is represented in the subject more than not. The meaning of any of these terms is dependent upon the context within which it is used, and the meaning may be expressly modified.

An embodiment of the invention text, as shown and described by the various figures and accompanying text, provides a luminaire 100 that includes an integrally molded cooling system according to an embodiment of the present invention is now described in detail. Throughout this disclosure, the present invention may be referred to as a luminaire, a digital lighting device, a lighting system, a light-emitting diode (LED), an LED lighting system, a lamp system, a lamp, a device, a system, a product, and a method. Those skilled in the art will appreciate that this terminology is only illustrative and does not affect the scope of the invention. For instance, the present invention may just as easily relate to lasers or other digital lighting technologies. Like numbers refer to like elements throughout.

Example methods and systems for a digital lighting device with an integrally molded cooling system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Some of the illustrative aspects of the present invention may be advantageous in solving the problems herein described and other problems not discussed which are discoverable by a skilled artisan.

Figure 1A:
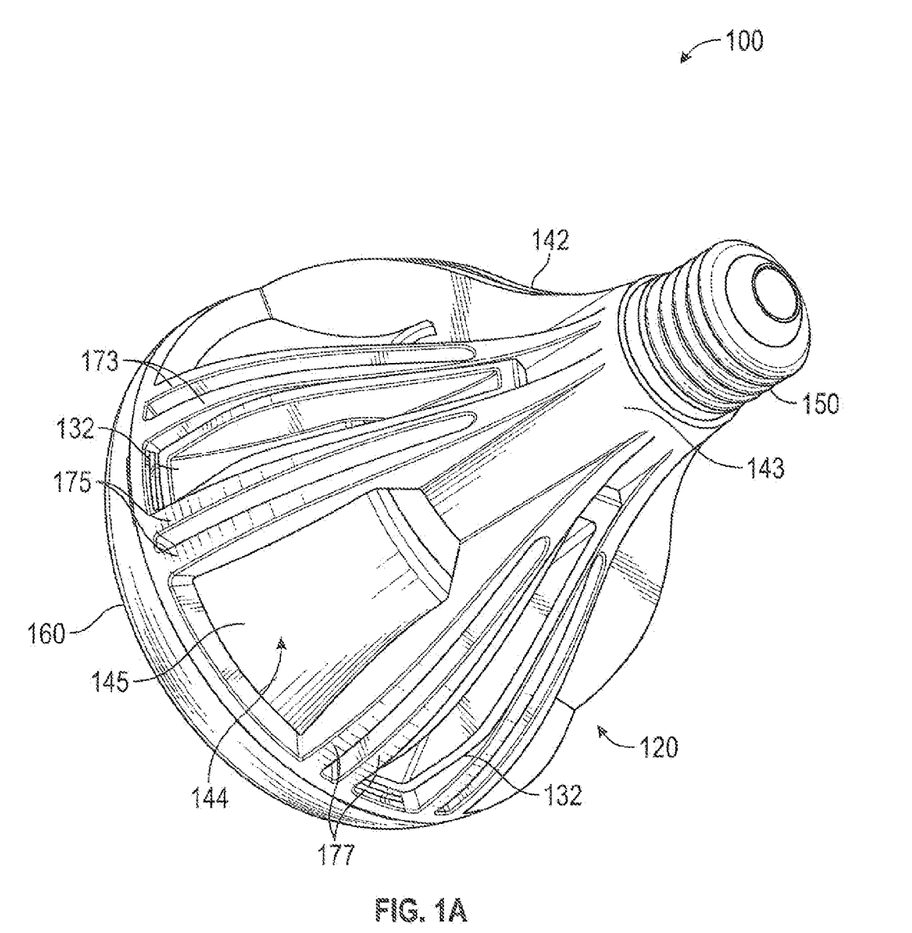
FIG. 1A is an assembled, perspective view of a luminaire having an integrally molded cooling system according to an embodiment of the present invention.
Figure 1B:
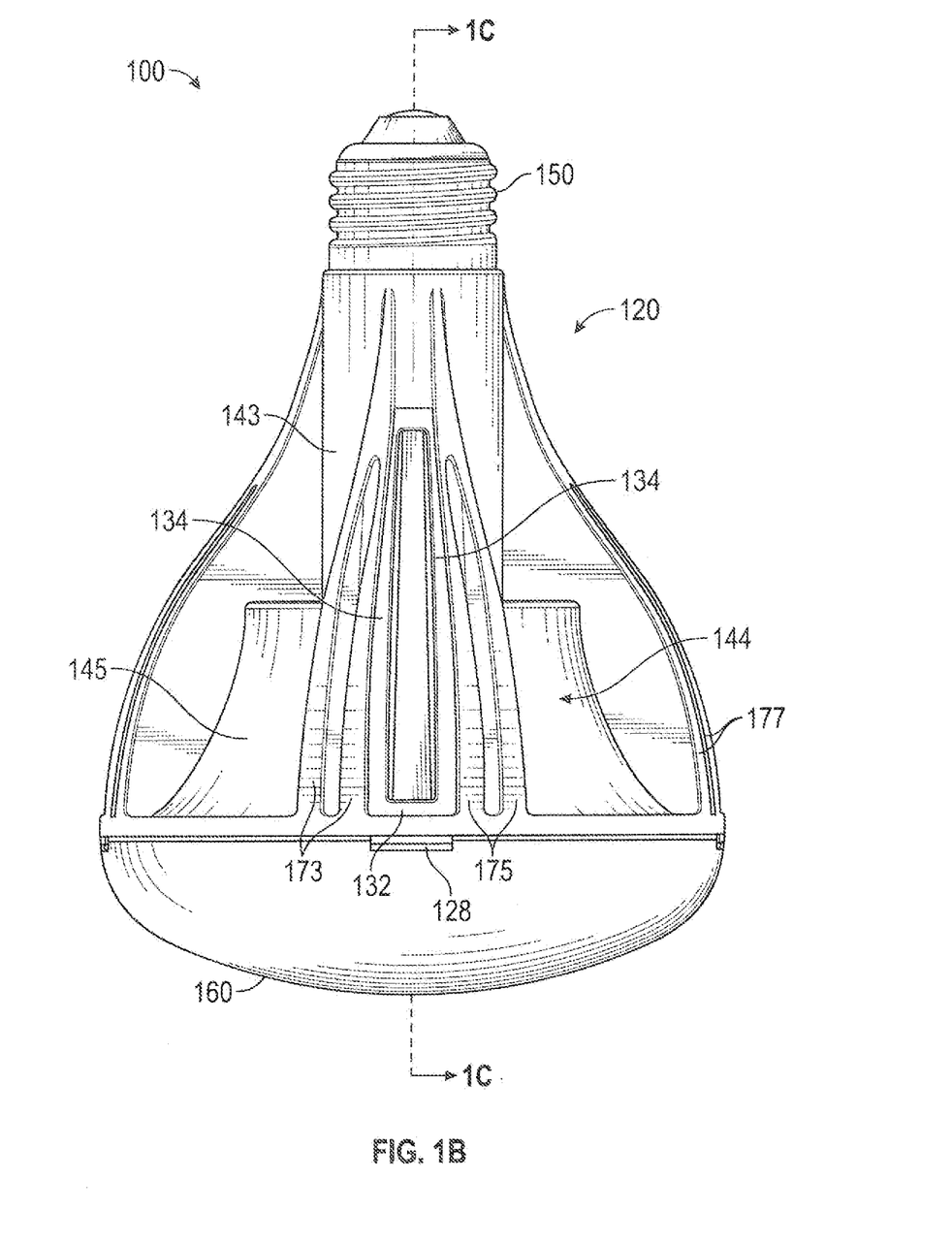
FIG. 1B is an assembled, front elevation view of the luminaire illustrated in FIG. 1A.
Figure 1C:
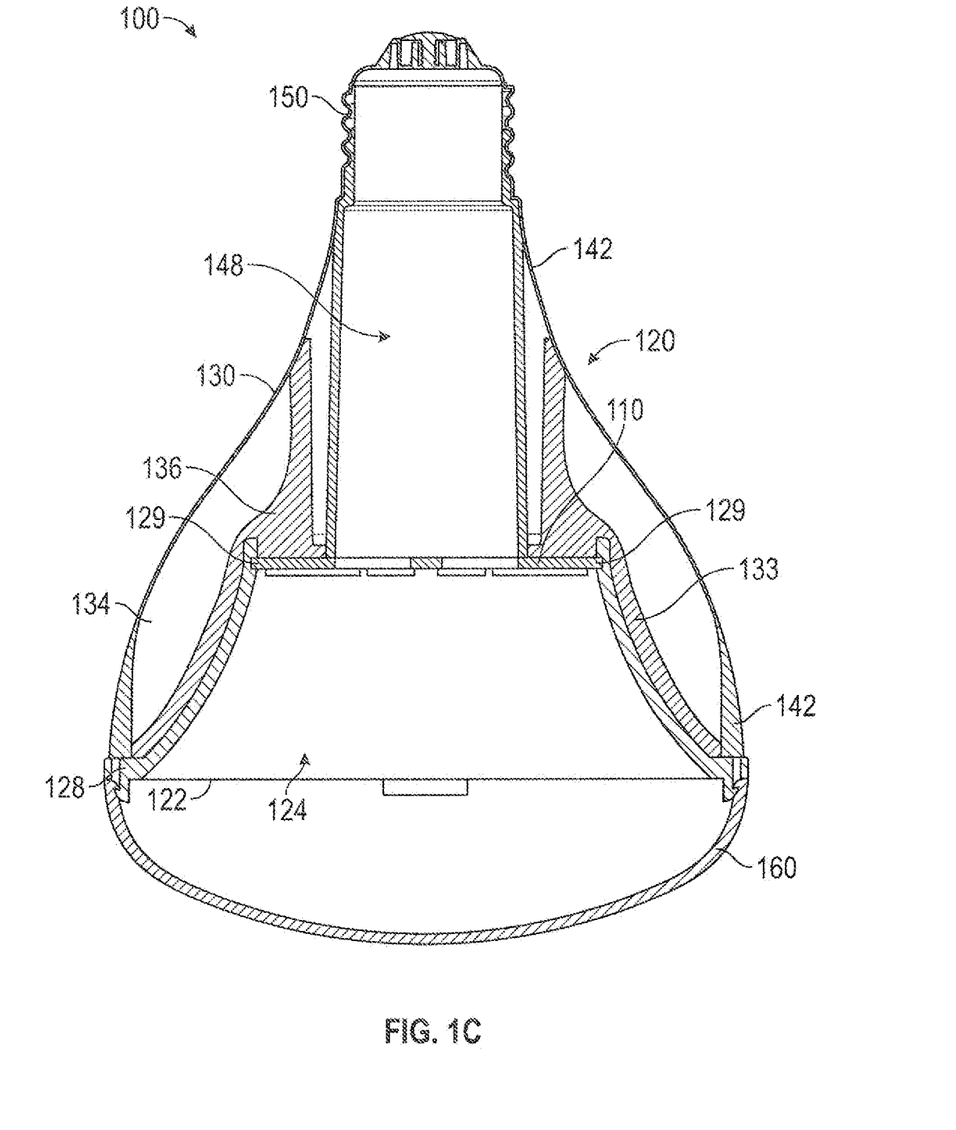
FIG. 1C is an assembled, cross sectional view of the luminaire illustrated in FIG. 1A taken through line 1C-1C.

Referring now to FIGS. 1A, 1B, 1C, and 1D, a luminaire 100 according to an embodiment of the invention will now be discussed. In various implementations, the luminaire 100 shown separately in FIGS. 1A through 1D may be used alone or together with other similar lighting assemblies in a system of lighting assemblies. Referring more specifically to FIG. 1C, the luminaire 100 may include an integrally molded cooling system 120 and a heat generating element in the form of a light source 110. The cooling system 120 may include a heat sink 130 and a base comprising a first housing 122 and a second housing 142. The luminaire 100 also may include an Edison connector 150 and an optic 160. The components comprising the cooling system 120 may be connected by any means known in the art, including, not by limitation, use of adhesives or glues, welding, and fasteners. Alternatively, one or more components of the cooling system 120 may be molded during manufacturing as an integral part of the cooling system 120.

Continuing to refer to FIGS. 1A, 1B, and 1C, the heat sink 130 of the integrally molded cooling system 120 of the luminaire 100, according to an embodiment of the present invention, may include one or more fin assemblies 132 and a heat-generating element contacting portion 136 from which the fin assemblies 132 may project. The fin assemblies 132 may increase a surface area of the heat sink 130 for the purpose of accomplishing thermal transfer. For example, and without limitation, the fin assemblies 132 in the embodiment illustrated in FIG. 1B may be characterized by an elongate shape, and may be configured to extend substantially a length of the heat sink 130 and to project radially outward therefrom. Those skilled in the art will appreciate, however, that the present invention contemplates the use of fin assemblies 132 that may extend any distance along the heat sink 130, and that the disclosed heat sink 130 that includes fin assemblies 132 that extend substantially the length thereof is not meant to be limiting in any way.

Referring more specifically to FIG. 1C, each of the fin assemblies 132 may comprise a body portion 133 and at least one fin 134. Each fin 134 may be configured to attach to and extend outwardly from a respective body portion 133. For example, and without limitation, some number of fin assemblies 134 included in the heat sink 130 may be identical in shape. Also for example, and without limitation, adjacent pairs of fins 134 may be positioned so as to define a void that may permit thermal fluid flow between the pair of fins 134, thereby enhancing the thermal dissipation capacity and the overall cooling capability of the heat sink 130.

Figure 1D:
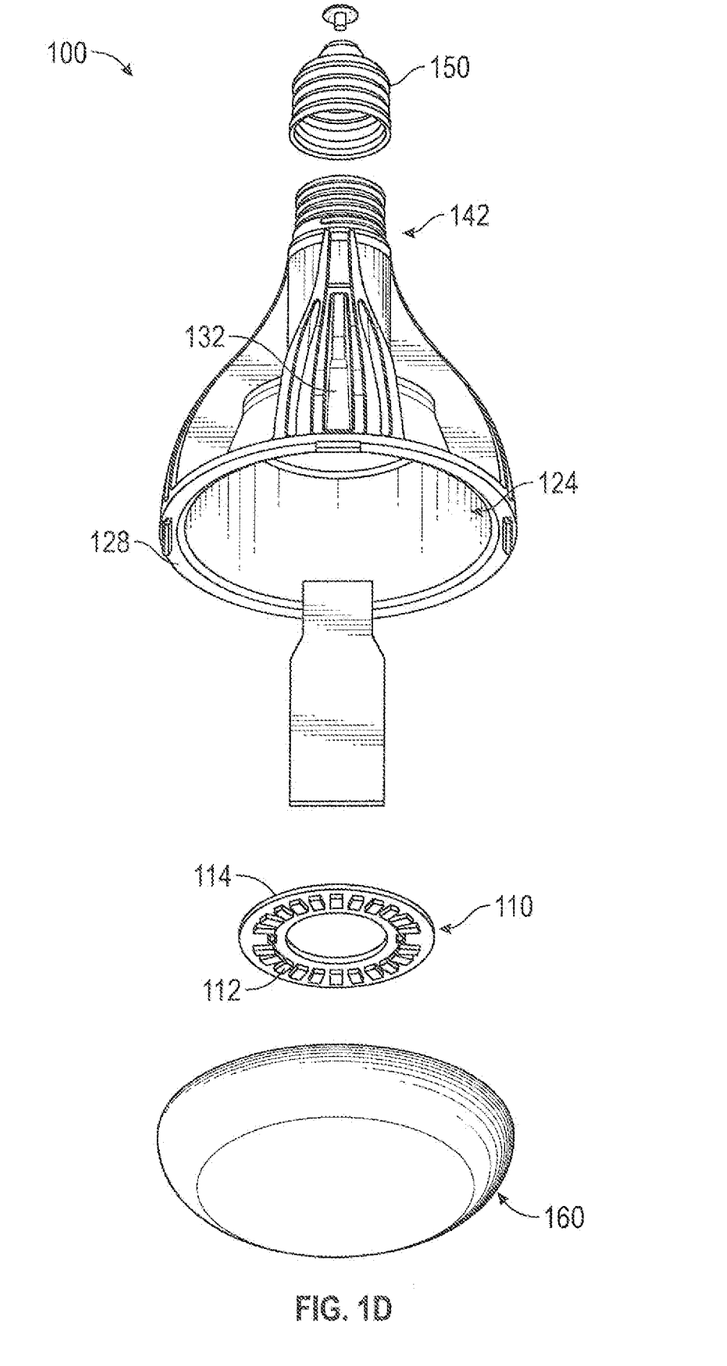
FIG. 1D is an exploded perspective view of the luminaire illustrated in FIG. 1A.
Figure 2:
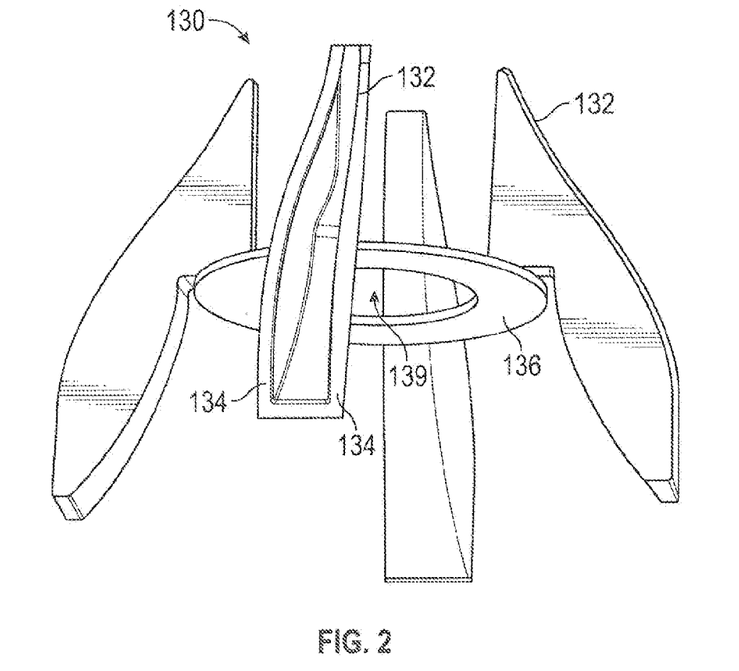
FIG. 2 is a perspective view of a heat sink of the luminaire illustrated in FIG. 1A.
Figure 3A:
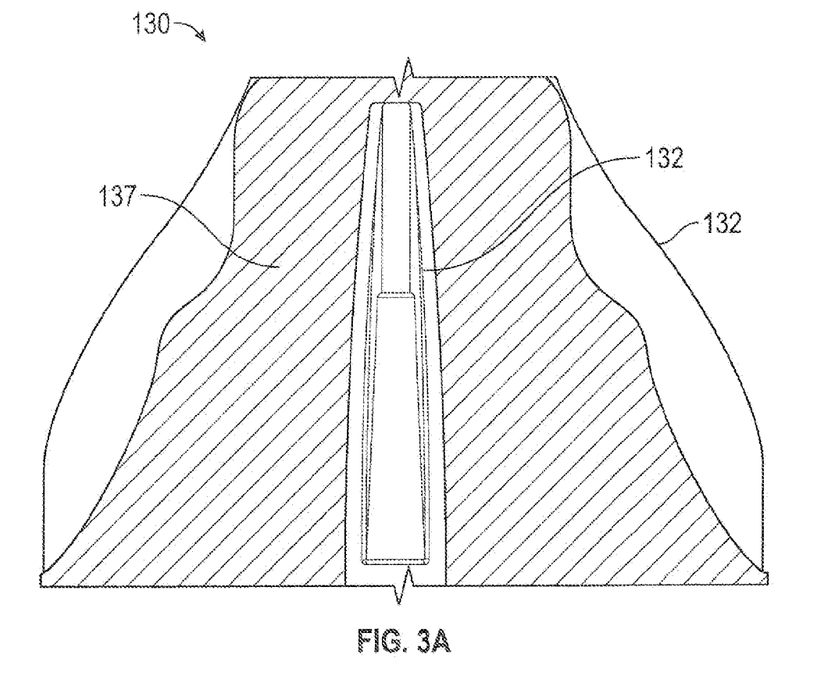
FIG. 3A is a front elevation view of a second embodiment of a heat sink of a luminaire having an integrally molded cooling system according to an embodiment of the present invention.
Figure 3B:
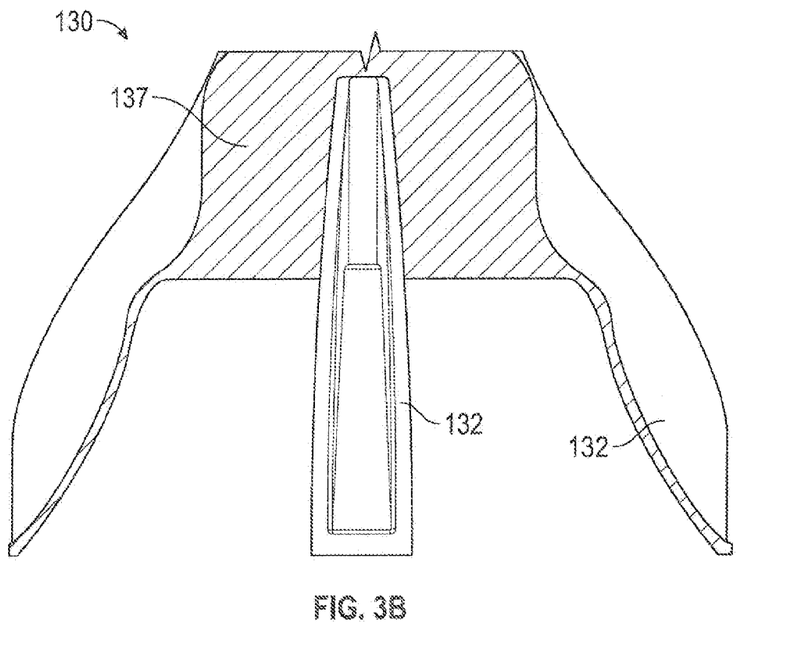
FIG. 3B is a front elevation view of a third embodiment of a heat sink of the luminaire having an integrally molded cooling system according to an embodiment of the present invention.

Referring more specifically to FIG. 1C, the heat sink 130 may be positioned adjacent to the light source 110, and may abut either of the first housing 122 and the second housing 142 of the integrally molded cooling system 120, or both. For example, and without limitation, the fin assemblies 132 of a heat sink 130 may be configured as projecting flanges (as illustrated in FIG. 2) into which the first housing 122 may be positioned such that the first housing 122 may make contact with the fin assemblies 132 of the heat sink 130 (as illustrated in FIG. 1D). As an alternative example, and without limitation, the heat sink 130 may present a frustoconical cup 136 (as illustrated in FIGS. 3A and 3B) into which the first housing 122 may be positioned such that the first housing 122 may make contact with the heat sink 130. More specifically, the heat sink may comprise a sidewall portion 137 having an inner surface that may be configured to fittedly receive the first housing 122. In such a configuration, the body portion 133 of each fin assembly 132 may be positioned substantially adjacent to an outer surface of the sidewall portion 137.

Referring again to FIGS. 1C, 3A, and 3B, the heat-generating element contacting portion 136 may be positioned in thermal communication with the light source 110. In addition the heat-generating element contacting portion 136 may be in thermal communication with the sidewall portion 137 of the heat sink 130, if present. Also, the heat-generating element contacting portion 136 may be positioned in thermal communication with one or more of the first housing 122 and the second housing 142. Accordingly, and as may be understood by those skilled in the art, the heat sink 130 advantageously may provide additional surface area for dissipation of heat that may be produced by the light source 110. For example, and without limitation, the heat-generating element contacting portion 136 may be configured into any shape, including a circle, ovoid, square, rectangle, triangle, or any other polygon. As illustrated in FIG. 2, the heat-generating element contacting portion 136 may include an aperture 139 through which, for example, and without limitation, at least one of an electrical connector and a circuit board may pass to form an electrical connection with the heat-generating element.

The heat sink 130 in general, and/or the heat-generating element contacting portion 136 in particular, may be made by molding, casting, or stamping of a thermally conductive material. For example, and without limitation, such thermally conductive materials may include metals, metal alloys, carbon allotropes, ceramics, and composite materials. Additional information directed to the use of heat sinks for dissipating heat in an illumination apparatus is found in U.S. Pat. No. 7,922,356 titled Illumination Apparatus for Conducting and Dissipating Heat from a Light Source, and U.S. Pat. No. 7,824,075 titled Method and Apparatus for Cooling a Light Bulb, the entire contents of each of which are incorporated herein by reference.

Referring now to FIG. 1D, the light source 110 of the luminaire 100 according to an embodiment of the present invention is now discussed in greater detail. The light source 110 may include any device capable of emitting light. For example and without limitation, the light source 110 may include incandescent lights, halogens, fluorescents (including compact-fluorescents), high-intensity discharges, light emitting diodes (LEDs), lasers, and any other light-emitting device known in the art. In some embodiments of the present invention, the light source 110 may be an LED package that may comprise a circuit board 114 and an LED 112 disposed on the circuit board 114. Additionally, in some embodiments, the light source 110 may comprise a plurality of LEDs 112 disposed on the circuit board. The circuit board 114 may be configured to be functionally coupled to the LED 112. For example, the circuit board 114 may comprise a substantially planar, annular-shaped body.

Referring again back to FIG. 1C, the heat sink 130 may be positioned adjacent the light source 110 and may be thermally coupled to the light source 110. This thermal coupling may be accomplished by any method, including thermal adhesives, thermal pastes, thermal greases, thermal pads, and all other methods known in the art. Where a thermal adhesive, paste, or grease is used, the heat sink 130 may be connected to any part of the light source 110 as may effectively cause thermal transfer between the light source 110 and the heat sink 130. This will largely depend on the heat distribution within the light source 110. For example, the heat sink 130 may be thermally coupled to an LED 112, to the circuit board 114, or both.

Continuing to refer to FIG. 1C, the circuit board 114 of the light source 110 may be sized to couple to the heat-generating element contacting portion 136 of the heat sink 130. For example, and without limitation, in the luminaire 100 presented in an assembled position as illustrated in FIG. 1C, the heat-generating element contacting portion 136 of the heat sink 130 may be aligned with the light source 110, with the heat sink 130 simultaneously in contact with the first housing 122 and to the second housing 142 of the integrally molded cooling system 120. In such a configuration, the second housing 142 may substantially cover all but the fin assemblies 132 of the heat sink 130, thereby advantageously presenting an aesthetically pleasing appearance of the luminaire 100 without compromising the heat dissipation characteristics of the heat sink 130. The method of thermal coupling may be selected based on criteria including ease of application/installation, thermal conductivity, chemical stability, structural stability, and constraints placed by the luminaire 100.

Referring now to FIGS. 2, 3A, and 3B, the heat sink 130 of the luminaire 100, according to an embodiment of the present invention, is discussed in greater detail. The heat sink 130 may include a number of fin assemblies 132 configured to provide a larger surface area than may otherwise be provided by the heat-generating element contacting portion 136 of the heat sink 130. The number of fin assemblies 132 included in the heat sink may be determined by the thermal dissipation capacity required to maintain a desired thermal equilibrium of the light source 110, as well as the number of channels included in the second housing 142, as will be described hereinbelow. In the present embodiments, the heat sink 130 includes four fin assemblies 132. The configuration of the fin assemblies 132 may be according to the direction of the incorporated references. The embodiment illustrated in FIG. 2, for example, and without limitation, shows fins 134 on each fin assembly 132 being curved to advantageously provide additional surface area to the heat sink 130 to advantageously provide additional dissipation of heat. Those skilled in the art will readily appreciate, however, that the fin assemblies 132 of the heat sink 130 may be configured in any way while still accomplishing the many goals, features and advantages according to the present invention.

Figure 4:
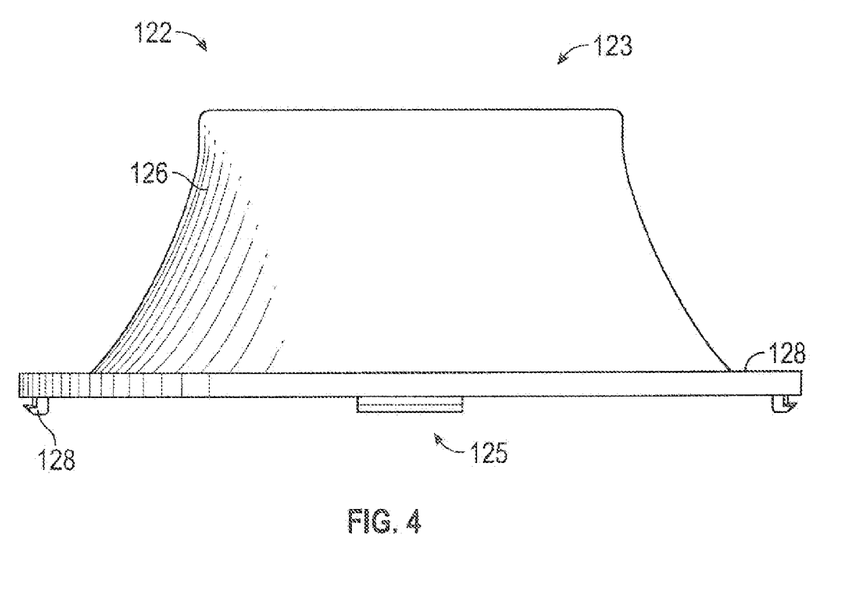
FIG. 4 is a front elevation view of a first housing of the luminaire illustrated in FIG. 1A.

Referring now to FIG. 4 and continuing to refer to FIG. 1C, the first housing 122 of the luminaire 100, according to an embodiment of the present invention, is discussed in greater detail. The first housing 122 may be configured to define an optical chamber 124 within a sidewall 126. More specifically, an inner surface of the sidewall 126 may define a volume of the optical chamber 124. In one embodiment, for example, and without limitation, the first housing 122 may have a hollow frustum shape characterized by an increased diameter from an upper end 123 of the first housing 122 towards a lower end 125 of the first housing 122. The light source 110 may be positioned adjacent to the upper end 123 of the first housing 122 and such that light emitted by the light source 110 may traverse the optical chamber 124 in the general direction of the lower end 125 of the first housing 122.

At least one of the circuit board 114 and the sidewall 126 of the first housing 122 may comprise a reflective layer. Either reflective layer may be disposed adjacent to the optical chamber 124, and may be configured to reflect light incident thereupon into the optical chamber 124. The reflective layer may be configured to reflect light incident thereupon at an intensity of at least about 95% of the original intensity of the incident light.

The reflective layers of the circuit board 114 and/or the sidewall 126 of the first housing 122 may be configured to be reflective by any method known in the art. For example, and without limitation, the first housing 122 may be formed of a material that is inherently reflective of light, and therefore the inner surface of the sidewall 126 inherently would be reflective. As another example, the sidewall 126 may be formed of a material that may be polished to become reflective. As yet another example, the sidewall 126, or at least an inner surface of the sidewall 126, may be formed of a material that is permissive of a material being coated, attached, or otherwise disposed thereupon, the disposed material being reflective. These methods of forming the reflective sidewall 126 are exemplary only and do not serve to limit the scope of the invention. All methods known in the art of forming a reflective surface are contemplated and included within the scope of the invention.

The reflective layers of the circuit board 114 and/or the sidewall 126 of the first housing 122 each may have an associated efficiency. More specifically, each reflective layer may reflect light incident thereupon at a percentage of the intensity of the incident light. For example, the reflective sidewall 126 may reflect incident light at least at about least 95% of the original intensity. The reflective sidewall 126 may be configured to reflect incident light within an intensity range from about 80% to about 99% of the original intensity.

Referring now to FIGS. 1B, 1C, and 1D, the optic 160 of the luminaire 100 according to an embodiment of the present invention will now be discussed in greater detail. The optic 160 may be positioned adjacent the optical chamber 124 such that light emitted by the light source 110 may traverse the optical chamber 124 and subsequently pass through the optic 160. The optic 160 may be configured to interact with light emitted by the light source 110 to collimate, refract, and/or diffuse incident light. Accordingly, the light source 110 may be disposed such that light emitted therefrom is incident upon the optic 160. The optic 160 may be formed in any shape to impart a desired collimation or refraction. Additionally, the optic 160 may be configured to generally diffuse light incident thereupon.

As illustrated in FIGS. 1B and 1C, the optic 160 may be positioned adjacent to the lower end 125 of the first housing 122 and attached to the first housing 122 to form a fluid seal therebetween, thereby sealing the optical chamber 124 between the light source 110, the sidewall 126 of the first housing 122, and the optic 160. Accordingly, a fluid seal may similarly be formed at the interface between the light source 110 and the sidewall 126 of the first housing 122. Each of the optic 160, first housing 122, and the light source 110 may be substantially fluidically impermeable, thus fluidically sealing the optical chamber 124 from the environment surrounding the luminaire 100.

In the embodiment illustrated in FIG. 4, for example, and without limitation, the sidewall 126 may have a generally curved shape and may be attached to an attaching lip 128 that may be configured to receive the optic 160. More specifically, the optic 160 may be positioned to interface mechanically with the attaching lip 128 to attach to and be carried by the integrally molded cooling system 120. For example, and without limitation, the optic 160 may form an interference fit with the attaching lip 128, the interference fit providing sufficient strength to carry the optic 160 thereby. In the alternative, and also for example, and without limitation, the optic 160 may be attached to the attaching lip 128 through the use of an adhesive, glue, or any other attachment method known in the art.

The optic 160 may be configured to interact with light emitted by the light source 110 to refract incident light. Accordingly, the light source 110 may be disposed such that light emitted therefrom is incident upon the optic 160. The optic 160 may be formed in any shape to impart a desired refraction. For example, and without limitation, the optic 160 as illustrated in FIGS. 1B, 1C, and 1D may have a generally concave geometry. Furthermore, the optic 160 may be formed of any material with transparent or translucent properties that comport with the desired refraction to be performed by the optic 160.

Additionally, the optic 160 may include a color conversion material. The color conversion material may be configured to receive a source light having a first wavelength, and to convert the wavelength of source light to a second wavelength, defined as a converted light. The color conversion material may be selected from the group consisting of phosphors, quantum dots, luminescent materials, fluorescent materials, and dyes. In some embodiments, the color conversion material may be disposed on the optic 160 so as to form a color conversion layer. In some embodiments, the color conversion material may be integrally formed with the optic 160. More details regarding the enablement and use of color conversion materials may be found in U.S. patent application Ser. No. 13/073,805, entitled MEMS Wavelength Converting Lighting Device and Associated Methods, filed Mar. 28, 2011, as well as U.S. patent application Ser. No. 13/234,604, entitled Remote Light Wavelength Conversion Device and Associated Methods, filed Sep. 16, 2011, U.S. patent application Ser. No. 13/234,371, entitled Color Conversion Occlusion and Associated Methods, filed Sep. 16, 2011, and U.S. patent application Ser. No. 13/357,283, entitled Dual Characteristic Color Conversion Enclosure and Associated Methods, the entire contents of each of which are incorporated herein by reference.

As shown in FIG. 1C, an upper end of the first housing 122 substantially opposite the optic 160 may be configured to define an aperture that may be sized to fittedly receive the heat-generating element contacting portion 136 of the heat sink 130. A circuit board receiving groove 129 may be presented as a notch in the sidewall 126 of the first housing 122 positioned generally near the aperture. A circuit board 114 may be mounted in the circuit board receiving groove 129 to form a seal. For example, and without limitation, the optical chamber 124 of the first housing 122 may be isolated from the environment exterior to the luminaire 100 such that fluid from the environment is not able to gain entry to the optical chamber 124 and intermix with the fluid contained therein. Hence, a fluid seal may be created about the optical chamber 124 of the first housing 122.

Still referring to FIG. 1C, the optical chamber 124 of the first housing 122 may be configured to have spatial characteristics permitting fluid flow within the optical chamber 124. For example, and without limitation, the fluid flow within the optical chamber 124 may cause the transfer of heat from the light source 110 through the walls of the first housing 122 to the heat sink 130, which may then transfer the heat to the external environment. For example, and without limitation, heat built up in the optical chamber 124 may flow through the light source 110 to the heat sink 130 and, in turn, to the external environment. Accordingly, the spatial characteristics of the optical chamber 124 may directly correspond to the amount of heat that may be transported from the luminaire 100 to the external environment. Spatial characteristics that may be modified include total volume, fluid flow characteristics, interior surface area, and exterior surface area. For example, and without limitation, one or more surfaces of the sidewall 126 of the first housing 122 may be textured or include grooves to increase the surface area of the sidewall 126, thereby facilitating thermal transfer thereto. Moreover, thermal properties of the materials used to form the first housing 122 and second housing 142 may be considered in forming the integrally molded cooling system 120.

The aforementioned spatial characteristics may be modified to accommodate the heat generated by the light source 110 of the luminaire 100. For instance, a volume of the optical chamber 124 may be directly proportional to the thermal output of the luminaire 100. Similarly, a surface area of some part of the integrally molded cooling system 120 may be proportional to the thermal output of the luminaire 100. In any case, the optical chamber 124 may be configured to maintain the temperature of the luminaire 100 at thermal equilibrium or within a target temperature range.

Figure 5:
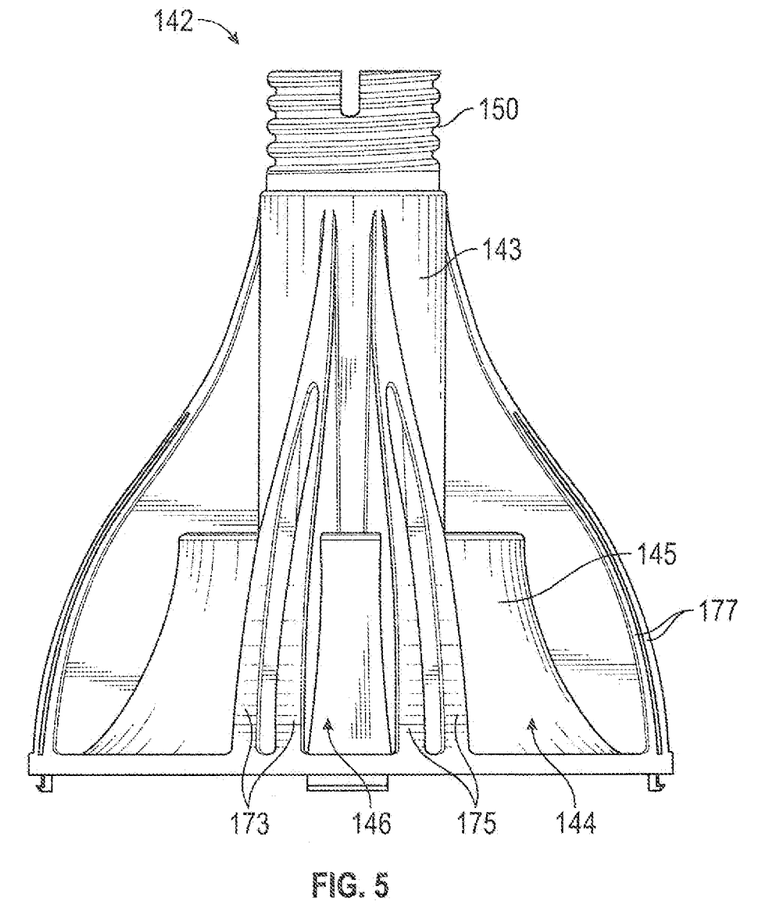
FIG. 5 is a front elevation view of a second housing of the luminaire having an integrally molded cooling system according to an embodiment of the present invention.

Referring now to FIG. 5, the second housing 142 of the luminaire 100, according to an embodiment of the present invention, is discussed in greater detail. The second housing 142 of the integrally molded cooling system 120 of the luminaire 100 may include a body 143 and a plurality of fin guards 173, 175, 177. Optionally, the second housing may include a head 145.

For example, and without limitation, the body 143 may be formed into any tubular shape, including a circle, ovoid, square, rectangle, triangle, or any other polygon. Referring to the embodiment of the luminaire 100 shown in FIG. 1C, the body 143 of the second housing 142 may comprise a hollow, substantially cylindrical walled core that may form a circuitry chamber 148. Each of the fin assemblies 132 may be configured to engage the second housing 142 such that a proximal edge of the base portion 133 of the fin assembly 132 may be positioned adjacent to an exterior of the circuitry chamber 148. The circuitry chamber 148 may be configured to carry a power supply and electronic control devices (not shown) within the body 143 of the integrally molded cooling system 120. For example, and without limitation, the circuitry chamber 148 may present a cylinder of sufficient diameter to permit wires to pass therethrough from the light source 110 to the Edison connector 150. Those skilled in the art will appreciate that although an Edison connector 150 is illustrated in FIG. 5 as being integrally molded into the second housing 142 of the luminaire 100, the electrical connector for the lighting device may be provided by any type of connector that is suitable for connecting the luminaire 100 to a power source. In order to maintain a fluid seal between the circuitry chamber 148 and the environment external to the luminaire 100, the body 143 may further include a sealing member. The sealing member may include any device or material that can provide a fluid seal as described above. For example, and without limitation, the sealing member may form a fluid seal between the body 143 and the Edison connector 150. Other embodiments may have the circuitry chamber disposed on other parts of the integrally molded cooling system 120.

The optional head 145 of the second housing 142 may be positioned to substantially encase the heat-generating element contacting portion 136 of a heat sink 130 between the first housing 122 and the second housing 142. More specifically, the exemplary heat-generating element contacting portions 136 illustrated in FIGS. 3A and 3B may be configured to be positioned fittedly between an outer surface of the first housing 122 and an inner surface of the head 145. Referring additionally to FIG. 1C, the head 145 may have an aperture adjacent the portion of the heat sink 130 that is in contact with the light source 110 to permit fluid to flow unimpeded from the optical chamber 124 through the circuit board 114 and the heat sink 130 to the external environment. The head 145 may also have one or more apertures that allow fin assemblies 132 of a heat sink 130 to project radially through the head 145 to expose the fins 134 to the environment external to the luminaire 100.

Continuing to refer to FIG. 5, an opposing pair of the fin guards 173, 175 may be positioned to form a channel 146 within which a respective fin assembly 132 of the heat sink 130 may be fittedly positioned, such that the insulating properties of the opposing fin guards 173, 175 may direct fluid flow outward from the luminaire 100 and away from the first housing 122. More specifically, and as illustrated in FIG. 1A, each fin assembly 132 of the heat sink 130 may be positioned within a respective channel 146 in the second housing 142 so that each fin assembly 132 may be substantially exposed to the environment external to the luminaire 100. Referring additionally to FIG. 1C, a proximal edge of the body portion 133 of each fin assembly 132 may be positioned adjacent to the outer surface of the first housing 122, while a distal edge of each fin 134 in the fin assembly 132 may be positioned coextensively with the respective channel 146 such that the distal edge is substantially exposed to the environment external to the luminaire 100.

Still referring to FIGS. 1A and 5, a spaced pair of the fin guards 175, 177 may be disposed adjacent the outer surface of the first housing 122 so as to present an enclosable region 144. In one embodiment, spacing of the spaced fin guards 175, 177 may allow molding of the second housing 142 such that one or more resultant enclosable regions 144 may create heat-protected spaces for receiving auxiliary components such as, for example and without limitation, a radio board (not shown). Such configuration and use of fin guards 173, 175, 177 may position heat-sensitive auxiliary components away from the unfavorable heat dissipation characteristics of the base of the luminaire 100, and more towards the open-air environment near the head 145 of the second housing 142, thereby advantageously producing favorable effects on the functionality of such components (for example, the radio transmission effects of a radio board).

Figure 6:
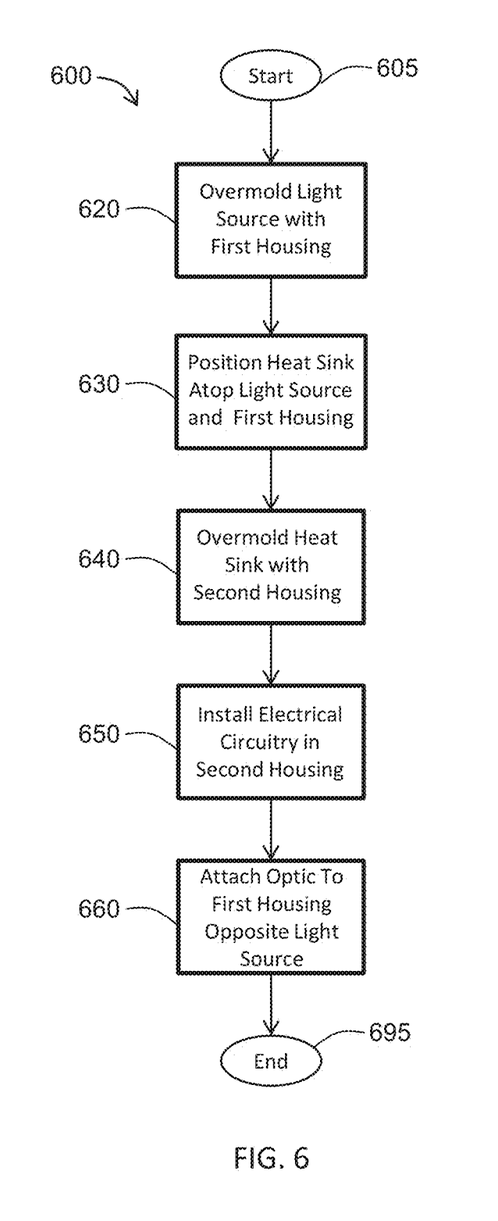
FIG. 6 is a flow chart of a method of assembling a luminaire having integrally molded cooling system according to an embodiment of the present invention.

Referring to FIG. 6 and additionally to FIGS. 1C, 1D, and 4, a method aspect of the present invention is now described in greater detail. The method according to the present invention, and as illustrated in the flowchart 600 of FIG. 6, is directed to assembling a luminaire 100 that dissipates heat using the integrally molded cooling system 120 of the present invention. From the start at Block 605, the light source 110 may be overmolded with the first housing 122 (Block 620). For example, and without limitation, some portion of the circuit board 114 the light source 110 may be overmolded with the first housing 122 such that the circuit board receiving groove 129 formed in the sidewall 126 of the first housing 122 may mate the light source 110 with the first housing 122. Overmolding of the light source 110 with the first housing 122 may be accomplished by any injection molding process known in the art. At Block 630, the heat sink 130 may be positioned over the first housing 122 such that the heat-generating element contacting portion 136 of the heat sink 130 may come into thermal contact with the light source 110. For example, and without limitation, the fin assemblies 132 of the heat sink 130 may contact the first housing 122. At Block 640, some portion of the heat sink 130 may be overmolded with the second housing 142 such that the opposing pair of fin guards 173, 175 may be formed to create channels 146 within which the respective fin assemblies 132 of the heat sink 130 may be fittedly positioned. For example, and without limitation, the fin guards 173, 175, 177 may connect to and mechanically support the body 143. The body 143 may present the circuitry chamber 148 configured to carry the power supply and electronic control devices (not shown). For example, and without limitation, overmolding of the second housing 142 may be accomplished by any injection molding process known in the art. At Block 650, the power supply and other electronic circuitry may be installed into the circuitry chamber 148 of the second housing body 143. At Block 660, the optic 160 may be attached to the luminaire 100 at an attaching lip 128 on the first housing 122, after which the method may end (Block 695).

Accordingly, the method illustrated in the flowchart 600 may allow a manufacturer of a luminaire 100 to advantageously mold a heat sink 130 integrally into a first housing 122 and a second housing 142 in such a way that may advantageously minimize costly and error-prone manual assembly, and that may advantageously support a lamp design with superior heat dissipation characteristics when used in a space-limited light fixture.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A luminaire comprising:
   a base comprising a first housing and a second housing, the first housing having an inner surface and an outer surface, and the second housing comprising a head that includes an aperture and a plurality of fin guards that include
      a first two of the plurality of fin guards, defined as a spaced pair; characterized by a heat-protected enclosable region formed therebetween, and
      a second two of the plurality of fin guards, defined as an opposing pair, characterized by a channel formed therebetween;
   a heat sink comprising a heat-generating element contacting portion and a plurality of fin assemblies connected to a perimeter of the heat-generating element contacting portion; and
   a heat-generating element positioned in thermal communication with the heat-generating element contacting portion of the heat sink;
   wherein an inner surface of the heat sink is positioned adjacent to the outer surface of the first housing; and
   wherein at least one of the plurality of fin assemblies of the heat sink is configured to project through the aperture in the head and into the channel in the second housing so that a distal edge of the at least one fin assembly is exposed to the environment external to the luminaire.

2. The luminaire according to claim 1 wherein each of the plurality of fin assemblies has an elongate shape and comprises a body portion and at least one fin:
   wherein the body portion is positioned substantially adjacent to the perimeter of the heat-generating element contacting portion; and
   wherein the at least one fin extends outwardly from the body portion.

3. The luminaire according to claim 2 wherein at least one fin assembly of the plurality of fin assemblies comprises at least one pair of fins that define a void therebetween.

4. The luminaire according to claim 1 wherein at least two of the plurality of fin assemblies are identical in shape.

5. The luminaire according to claim 1 wherein a proximal edge of at least one fin assembly of the plurality of fin assemblies is positioned adjacent to the outer surface of the first housing, and the distal edge of the at least one fin assembly is positioned coextensively with the channel.

6. The luminaire according to claim 1 wherein the heat-generating element contacting portion comprises at least one thermally conductive material selected from the group consisting of metal, metal alloys, carbon allotrope, thermoplastic, ceramic, porcelain, aluminum, aluminum alloys and composite material.

7. The luminaire according to claim 1 wherein the heat-generating element contacting portion includes an aperture through which an electrical connector passes to form an electrical connection with the heat-generating element.

8. The luminaire according to claim 1 wherein the second housing further comprises a circuitry chamber defined as a substantially cylindrical walled core having an interior and an exterior; and wherein each of the plurality of fin assemblies is configured to engage the second housing such that a proximal edge of at least one fin assembly of the plurality of fin assemblies is positioned adjacent to the exterior of the circuitry chamber, and the distal edge of the at least one fin assembly is positioned coextensively with the channel.

9. The luminaire according to claim 8 further comprising a power supply carried within the interior of the circuitry chamber.

10. The luminaire according to claim 1 wherein the heat-generating element is positioned in thermal communication with the second housing.

11. The luminaire according to claim 1 wherein the first housing is characterized by a hollow frustum shape having an upper end, a lower end, and an increased diameter from the upper end towards the lower end, wherein the inner surface of the first housing is configured to define an optical chamber having a volume.

12. The luminaire according to claim 11 wherein the heat-generating element comprises a light source, the light source comprising:
a circuit board having a substantially planar body, and
a light-emitting diode (LED) disposed on the circuit board;
wherein the light source is positioned adjacent to the upper end of the first housing and such that light emitted by the LED is emitted into the optical chamber and toward the lower end of the first housing.

13. The luminaire according to claim 12 wherein at least one of the circuit board and the first housing further comprises a reflective layer disposed adjacent to the optical chamber; and wherein the reflective layer is configured to reflect light incident thereupon into the optical chamber.

14. The luminaire according to claim 13 wherein the reflective layer is configured to reflect light incident thereupon at an intensity of at least about 95% of the original intensity of the incident light.

15. The luminaire according to claim 12 further comprising an optic positioned adjacent to the lower end of the first housing and attached to the first housing to seal the optical chamber between the light source, the inner surface of the first housing, and the optic.

16. The luminaire according to claim 15 wherein the optic is configured to at least one of collimate, refract, and diffuse light emitted by the light source.

17. The luminaire according to claim 15 wherein the optic comprises a color conversion layer; wherein the light source is configured to emit a source light within a first wavelength range; wherein the color conversion layer is configured to convert light within the first wavelength range to a converted light within a second wavelength range; and wherein the color conversion layer comprises a conversion material selected from the group consisting of phosphors, quantum dots, luminescent materials, fluorescent materials, and dyes.

18. A method for assembling a luminaire comprising a light source having at least one light emitting diode (LED) operably coupled to a circuit board, and a heat sink comprising a heat-generating element contacting portion comprising a perimeter connected to at least one fin assembly, the method comprising the steps of:
overmolding the light source with a first housing characterized by a hollow frustum shape having an inner surface, an outer surface, an upper end, a lower end, and an increased diameter from the upper end towards the lower end, wherein the inner surface of the first housing is configured to define an optical chamber having a volume;
positioning the heat sink adjacent to the outer surface of the first housing such that the heat-generating element contacting portion is in thermal communication with the light source;
overmolding the heat sink with a second housing comprising
a head formed therein that includes an aperture,
at least one heat-protected enclosable region formed therein by a respective spaced pair of a plurality of fin guards, and
at least one channel formed therein by a respective opposing pair of the plurality of fin guards;
wherein the step of overmolding the heat sink with the second housing further comprises projecting the at least one fin assembly of the heat sink through the aperture in the head and into a respective at least one channel in the second housing such that the at least one fin assembly is exposed to the environment external to the luminaire.

19. The method according to claim 18 wherein the second housing further comprises a circuitry chamber defined as a substantially cylindrical walled core having an interior and an exterior, the method further comprising the step of installing electrical circuitry within the circuitry chamber, wherein the electrical circuitry includes a power supply.

20. The method according to claim 18 wherein the method further comprises the step of attaching an optic adjacent to a lower end of the first housing and attached to the first housing to seal an optical chamber between the light source, the inner surface of the first housing, and the optic.

* * * * *